United States Patent
Nishimura et al.

(10) Patent No.: US 9,588,909 B2
(45) Date of Patent: Mar. 7, 2017

(54) INFORMATION PROCESSING TECHNIQUE TO MANAGE SECURITY ATTRIBUTES OF DATA GENERATED IN DIFFERENT MODES

(71) Applicant: International Business Machines Corporation, Armonk, NY (US)

(72) Inventors: Yasutaka Nishimura, Tokyo (JP); Masami Tada, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 14/538,440

(22) Filed: Nov. 11, 2014

(65) Prior Publication Data

US 2015/0178223 A1  Jun. 25, 2015

(30) Foreign Application Priority Data

Dec. 19, 2013 (JP) ................................ 2013-262987

(51) Int. Cl.
  *G06F 12/00* (2006.01)
  *G06F 12/14* (2006.01)

(52) U.S. Cl.
  CPC .............................. *G06F 12/1441* (2013.01)

(58) Field of Classification Search
  None
  See application file for complete search history.

(56) References Cited

U.S. PATENT DOCUMENTS

| | | | | |
|---|---|---|---|---|
| 8,397,026 | B2* | 3/2013 | Wynne | G06F 21/575 707/785 |
| 2008/0184373 | A1* | 7/2008 | Traut | G06F 9/45533 726/26 |
| 2008/0276058 | A1* | 11/2008 | Mosek | G06F 12/1441 711/163 |
| 2009/0320141 | A1 | 12/2009 | Wang et al. | |
| 2011/0107018 | A1* | 5/2011 | Honda | G06F 3/0607 711/103 |
| 2012/0036347 | A1* | 2/2012 | Swanson | G06F 21/79 713/2 |

FOREIGN PATENT DOCUMENTS

| | | |
|---|---|---|
| JP | 2009519511 A | 5/2009 |
| JP | 2009289298 A | 12/2009 |
| JP | 2012527821 A | 11/2012 |
| JP | 2013539106 A | 10/2013 |
| WO | WO2010147609 A1 | 12/2010 |

* cited by examiner

*Primary Examiner* — Daniel Tsui
(74) *Attorney, Agent, or Firm* — Yee & Associates, P.C.; Richard A. Wilhelm

(57) ABSTRACT

An information processing apparatus includes a storage managing unit configured to manage a storage device by dividing the storage device into a plurality of physical storage regions corresponding to respective modes used by the information processing apparatus, and a storage processing unit configured to cause data generated by the information processing apparatus during operation in a mode to be stored in a physical storage region corresponding to the mode. For example, the storage managing unit stores a policy in the storage device. The policy defines whether to permit the use of data between a plurality of security attributes corresponding to the respective physical storage regions.

14 Claims, 13 Drawing Sheets

Bus: BUSINESS MODE
Pub: PUBLIC MODE
Pri: PRIVATE MODE

| LIST LT |
|---|
| Bus > Pub |
| Pub < Pri |
| Pri <> Bus |
| Pri > Pub |

US 9,588,909 B2

INFORMATION PROCESSING TECHNIQUE TO MANAGE SECURITY ATTRIBUTES OF DATA GENERATED IN DIFFERENT MODES

CROSS-REFERENCE TO RELATED APPLICATION(S)

This application claims the benefit of priority to Japanese Patent Application No. 2013-262987, filing date Dec. 19, 2013, the entire contents of which are incorporated herein by reference.

TECHNICAL FIELD

The present invention relates to an information processing apparatus, method, and program.

BACKGROUND ART

A security control technique for access to and copying of data, such as documents, in an information processing apparatus is known (e.g., see, Patent Literature 1).
Patent Literature 1: Japanese Unexamined Patent Application Publication No. 2009-289298
Patent Literature 2: Japanese Unexamined Patent Application Publication (Translation of PCT Application) No. 2009-519511.

SUMMARY OF INVENTION

Technical Problem

The technique described above has a problem of not being easy to set a security level depending on the setting, such as a business or private setting.

Solution to Problem

A first aspect of the present invention provides an information processing apparatus that includes a storage managing unit configured to manage a storage device by dividing the storage device into a plurality of physical storage regions corresponding to respective modes used by the information processing apparatus, and a storage processing unit configured to cause data generated by the information processing apparatus during operation in a mode to be stored in a physical storage region corresponding to the mode. The first aspect of the present invention also provides a method and a program related to the information processing apparatus.

The summary of the invention does not list all features necessary for the present invention. Sub-combinations of groups of these features may also constitute the invention.

DESCRIPTION OF EMBODIMENTS

The present invention will be described through the use of embodiments of the invention, but the following embodiments do not limit the invention set forth in the scope of claims. Also, not all combinations of features described in the embodiments are necessarily essential to the solving means of the invention.

Figure 1:
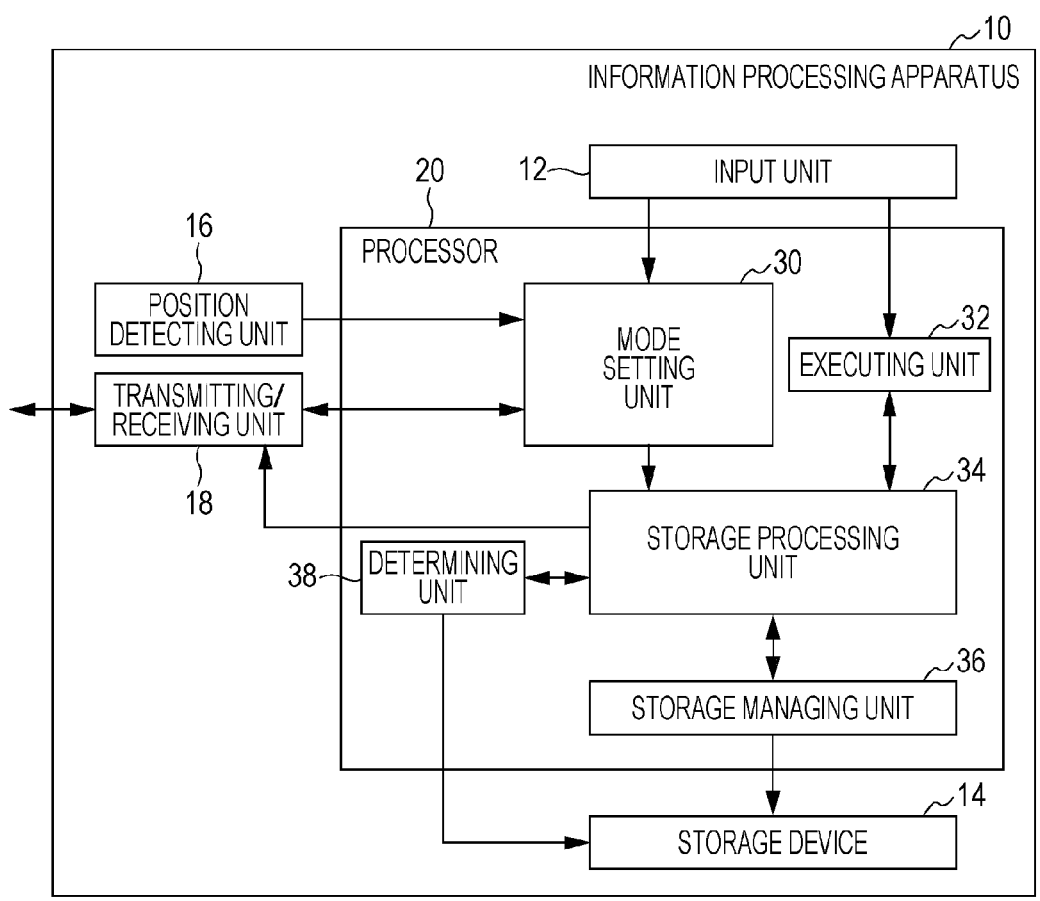
FIG. 1 illustrates a general configuration of an information processing apparatus 10.

FIG. 1 illustrates a general configuration of an information processing apparatus 10. Examples of the information processing apparatus 10 include a tablet terminal, a smartphone, a notebook personal computer, and a desktop personal computer. The information processing apparatus 10 is capable of switching among a plurality of different modes. The information processing apparatus 10 stores data DT generated in each mode in a different physical storage region of a storage device 14. The plurality of modes include, for example, business mode Bus used during work, public mode Pub used to disclose or access social networking service (SNS) and Web site information, and private mode Pri used privately for personal use. Thus, the information processing apparatus 10 can easily manage security attributes of data DT generated in different modes.

As illustrated in FIG. 1, the information processing apparatus 10 includes an input unit 12, the storage device 14, a position detecting unit 16, a transmitting/receiving unit 18, and a processor 20.

The input unit 12 is configured to allow a user to input data DT and commands, such as application start commands. The input unit 12 is connected to the processor 20. The input unit 12 outputs data DT and commands input by the user to the processor 20. Examples of the input unit 12 include a keyboard, a mouse, and a touch panel.

The storage device 14 stores data DT. Examples of the storage device 14 include a secondary storage and a random-access memory (RAM). The secondary storage is, for example, an internal hard disk, an external hard disk, or a removable universal serial bus (USB) memory.

The position detecting unit 16 is connected to the processor 20. The position detecting unit 16 detects a position of the information processing apparatus 10 and outputs the detected position to the processor 20. Examples of the position detecting unit 16 include a global positioning system (GPS) terminal.

The transmitting/receiving unit 18 is connected to the processor 20. The transmitting/receiving unit 18 is connected via wired or wireless connection to an external information processing apparatus such that data DT can be transmitted to and received from the external information processing apparatus. The transmitting/receiving unit 18 outputs data DT received from the external information processing apparatus to the processor 20. The transmitting/receiving unit 18 transmits data DT received from the processor 20 to the external information processing apparatus. Also, the transmitting/receiving unit 18 outputs network information of the information processing apparatus 10 to the processor 20.

The processor 20 controls an overall operation of the information processing apparatus 10. For example, the information processing apparatus 10 includes a computing device, such as a central processing unit (CPU), and a chip set that operates in conjunction with a CPU or the like. The processor 20 includes a mode setting unit 30, an executing unit 32, a storage processing unit 34, a storage managing unit 36, and a determining unit 38.

The mode setting unit 30 sets the information processing apparatus 10 to one of a plurality of modes. The mode setting unit 30 switches the information processing apparatus 10 among three different modes, including business mode Bus, public mode Pub, and private mode Pri. The mode setting unit 30 sets a mode in accordance with a user's mode input received from the input unit 12. The mode setting unit 30 may set a mode in accordance with positional information received from the position detecting unit 16, the positional information indicating a position of the information processing apparatus 10. The mode setting unit 30 may set a mode in accordance with network information received from the transmitting/receiving unit 18, the network information indicating the environment and conditions of a network to which the information processing apparatus 10 is connected.

The executing unit 32 starts and executes an application. The executing unit 32 starts an application specified by the user, in accordance with a user's execution instruction received from the input unit 12. When a selection instruction received from the input unit 12 and indicating that the user has selected a file FL is input, the executing unit 32 starts an application associated with the file FL. The file FL contains one or more pieces of data DT.

The storage processing unit 34 causes the storage managing unit 36 to store data DT generated by the information processing apparatus 10 during operation in a mode, in a physical storage region corresponding to the mode.

The storage managing unit 36 manages the storage device 14 by dividing it into a plurality of physical storage regions (described below) corresponding to respective modes used by the information processing apparatus 10. The physical storage regions once obtained by dividing the storage device 14 may be fixed and made unchangeable by the storage managing unit 36. The storage managing unit 36 stores data DT received from the storage processing unit 34 in the storage device 14.

When receiving an instruction to add data DT having a security attribute assigned thereto to data DT having another security attribute assigned thereto, the determining unit 38 determines whether to add the data DT in accordance with a mode in operation and a policy PL (described below).

Figure 2:
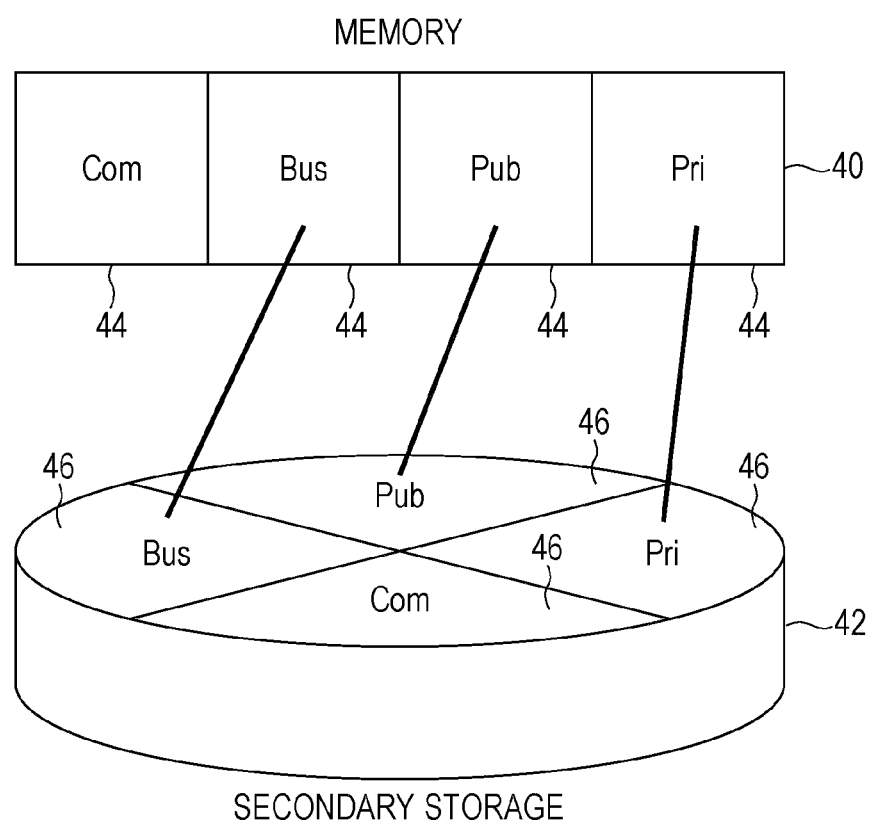
FIG. 2 illustrates physical storage regions 44 and 46 of a storage device 14.

FIG. 2 illustrates physical storage regions 44 and 46 of the storage device 14. As illustrated in FIG. 2, the storage managing unit 36 manages the storage device 14 by dividing it into a plurality of physical storage regions 44 and 46 corresponding to a plurality of modes. Specifically, the storage managing unit 36 divides the storage device 14 into a plurality of physical storage regions 44 and 46, which are associated with each of business mode Bus, public mode Pub, and private mode Pri. For example, the storage device 14 has a memory 40 and a secondary storage 42. On the basis of physical addresses of the physical storage regions 44 and 46 in which data DT is stored, the storage managing unit 36 determines the mode in which the data DT has been generated, and identifies a security attribute for determining whether to permit transmission and reception of data between modes. The storage managing unit 36 may set, in the storage device 14, common physical storage regions 44 and 46 that can be used in any mode. The storage managing unit 36 stores an operating system (OS), middleware, and application software in the common physical storage regions 44 and 46.

Figure 3:
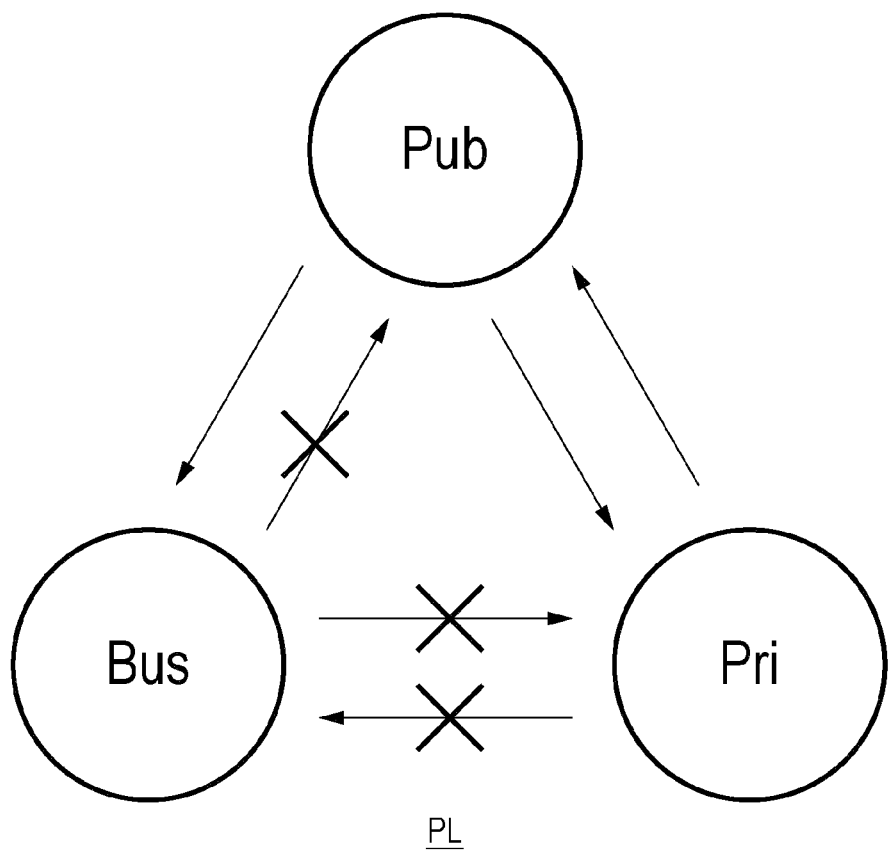
FIG. 3 illustrates a policy PL set by a storage managing unit 36.

FIG. 3 illustrates a policy PL set by the storage managing unit 36. The storage managing unit 36 sets a policy PL and stores it in the storage device 14. The policy PL defines whether to permit data transmission and reception between security attributes corresponding to physical storage regions 44 and 46. The policy PL may be stored, for example, as part of an access control list (ACL). By storing data DT generated in each mode in the physical storage regions 44 and 46 corresponding to the mode, the storage managing unit 36 can identify the security attribute and determine whether to permit data transmission and reception.

In the example illustrated in FIG. 3, the storage managing unit 36 sets security attributes of public mode Pub and business mode Bus in the policy PL so as to permit data DT generated in public mode Pub to be used in business mode Bus and not to permit data DT generated in business mode Bus to be used in public mode Pub. The storage managing unit 36 sets security attributes of public mode Pub and private mode Pri in the policy PL so as to permit data DT generated in public mode Pub to be used in private mode Pri and to permit data DT generated in private mode Pri to be used in public mode Pub. The storage managing unit 36 sets security attributes of private mode Pri and business mode Bus in the policy PL so as not to permit data DT generated in private mode Pri to be used in business mode Bus and so as not to permit data DT generated in business mode Bus to be used in private mode Pri. When data DT in private mode Pri is used in business mode Bus for business purposes, the policy PL may be set, for example, by a company's legal examination based on copyright.

Figure 4:
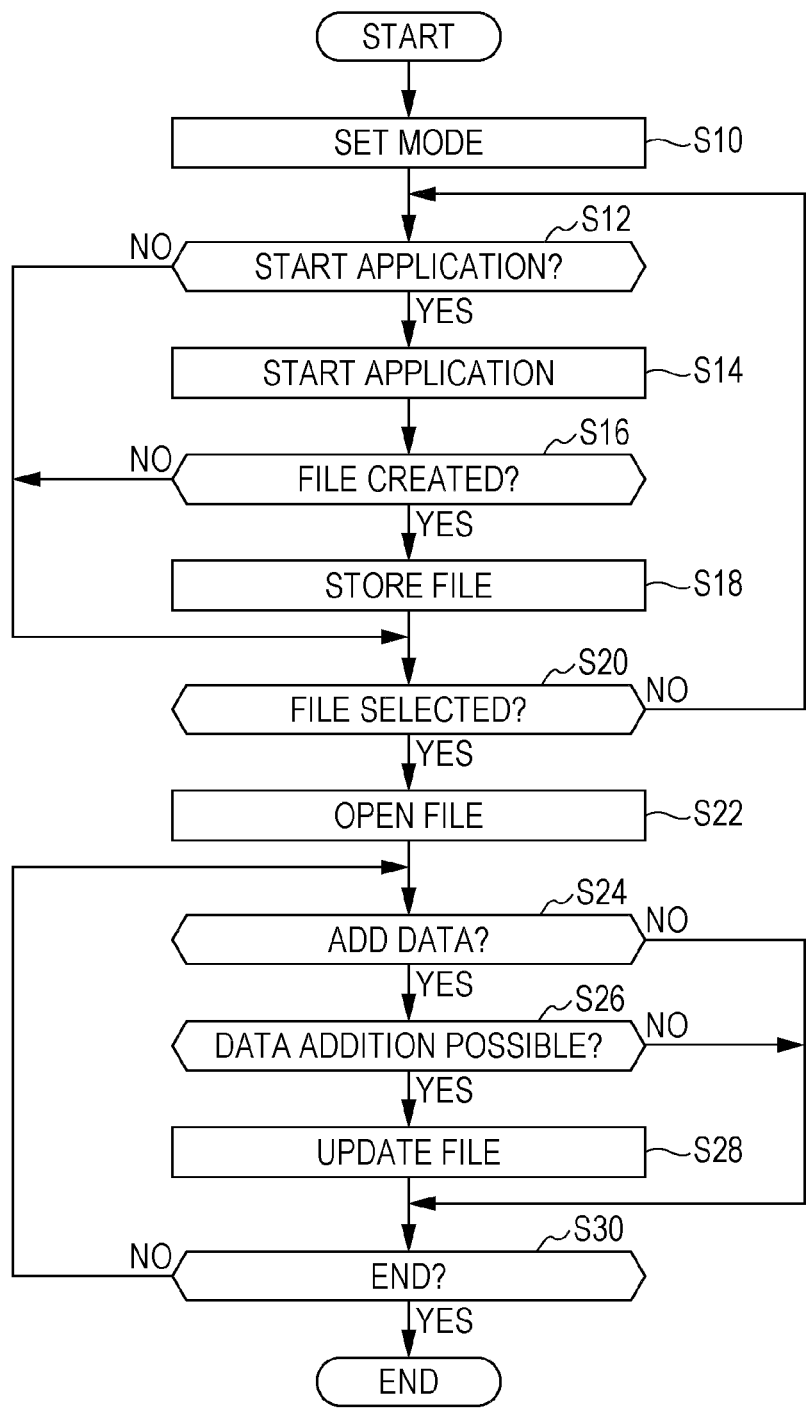
FIG. 4 is a flowchart of a storage managing process.
Figure 5:
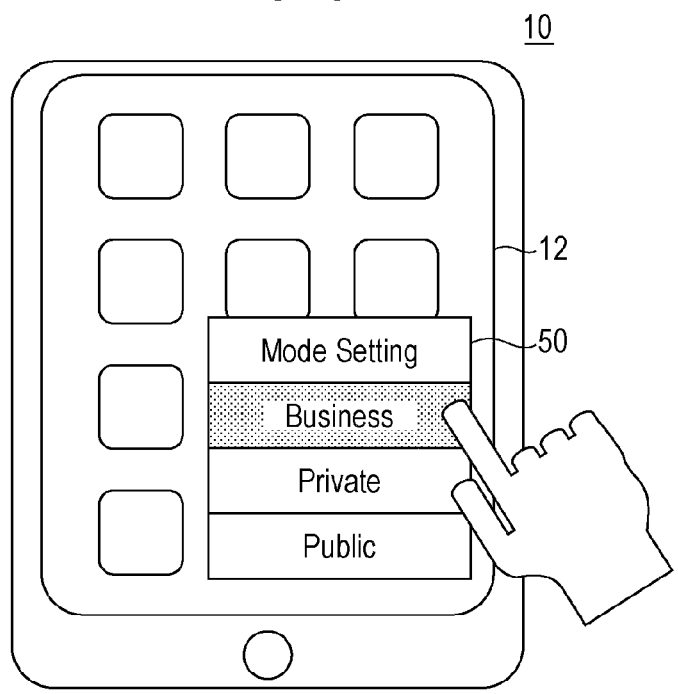
FIG. 5 illustrates the storage managing process.

FIG. 4 is a flowchart of a storage managing process. A storage managing process is executed when the processor 20 reads a storage managing program. FIGS. 5 to 8 each illustrate the storage managing process.

In the storage managing process, first, the mode setting unit 30 sets a mode (step S10). In a mode setting screen (see FIG. 5) where a mode list 50 is displayed by the mode setting unit 30, for example, the mode setting unit 30 receives a user's mode input specifying any of the modes from the input unit 12 and sets the specified mode. The mode setting unit 30 may set the mode on the basis of information received from the position detecting unit 16 and the transmitting/receiving unit 18. The mode setting unit 30 outputs the set mode to the storage processing unit 34. The mode setting may be executed appropriately at the start of the information processing apparatus 10, at the start of an application, etc.

Next, the executing unit 32 determines whether to start an application (step S12). When the user selects an application and gives an instruction to start the application using the input unit 12, the executing unit 32 receives the application start instruction from the input unit 12. Thus, the executing unit 32 determines to start the application (YES in step S12) and starts the application (step S14). If no start instruction is received from the input unit 12 (NO in step S12), the executing unit 32 does not execute the operation in step S14.

Figure 6:
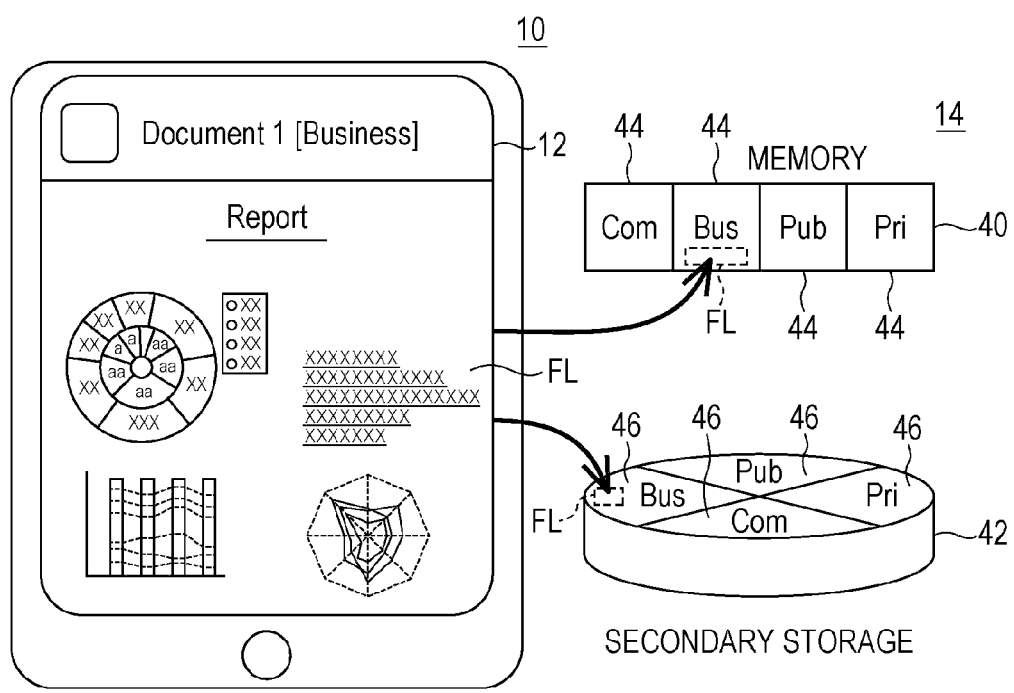
FIG. 6 illustrates the storage managing process.

Next, the storage processing unit 34 determines whether the user has created a file FL containing data DT by using the application (step S16). For example, when the user creates a document file FL, such as that illustrated in FIG. 6, by manipulating the application in operation, the executing unit 32 outputs the file FL and a notification indicating that the file FL has been created to the storage processing unit 34. Thus, the storage processing unit 34 determines that the file FL has been created (YES in step S16) and causes the storage managing unit 36 to store the file FL in the physical storage regions 44 and 46 associated with the current mode (step S18). For example, when the information processing apparatus 10 is set to business mode Bus, the storage processing unit 34 causes the storage managing unit 36 to store the created file FL in the physical storage regions 44 and 46 having a security attribute corresponding to business mode Bus, as illustrated in FIG. 6. The storage managing unit 36 may store the file FL in each of the physical storage regions 44 and 46 of the memory 40 and the secondary storage 42, or may initially store the file FL only in the physical storage region 44 of the memory 40. If the file FL has not been created (NO in step S16), the storage processing unit 34 does not execute the operation in step S18.

Next, the executing unit 32 determines whether the file FL has been selected (step S20). When the user selects the file FL using the input unit 12, the executing unit 32 receives a selection instruction to select the file FL from the input unit 12. This enables the executing unit 32 to determine that the file FL has been selected (YES in step S20). Then, the executing unit 32 starts an application associated with the file FL (step S22). On the other hand, if no selection instruction is received from the input unit 12 (NO in step S20), the executing unit 32 does not perform the operation in step S22 and repeats the operations in step S12 and the subsequent steps.

Next, the storage processing unit 34 determines whether an addition instruction to add another data DT to the opened file FL has been input (step S24). For example, when the user inputs an addition instruction to add text data DT or image data DT to a document file FL in an opened state by manipulating the application, the executing unit 32 outputs the addition instruction and the data DT to the storage processing unit 34. Thus, the storage processing unit 34 determines that an addition instruction to add the data DT has been input (YES in step S24) and outputs the data DT and the file FL to the determining unit 38. The determining unit 38 determines whether the data DT can be added in accordance with the policy PL (step S26).

Figure 7:
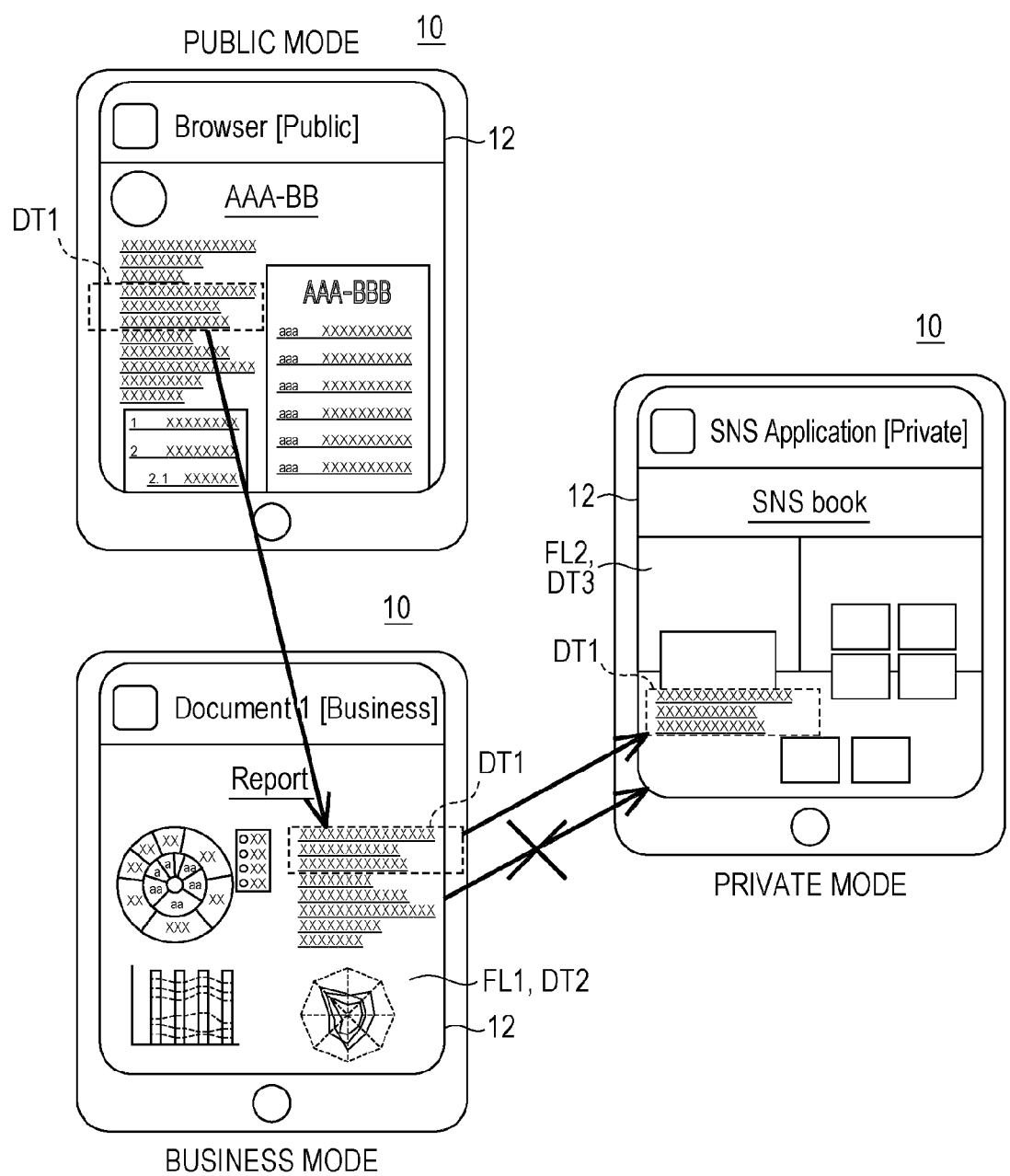
FIG. 7 illustrates the storage managing process.

For example, assume that the user pastes text data DT1 (see a region enclosed by a dotted line in the upper left drawing of FIG. 7) copied to a clipboard on an Internet website being viewed in public mode Pub, into a document file FL1 containing data DT2 (see the lower left drawing of FIG. 7) generated in business mode Bus. In this case, since the data DT1 in public mode Pub can also be used in business mode Bus as described with reference to FIG. 3, the determining unit 38 determines that the data DT1 can be added to the file FL1 (YES in step S26) and outputs the determination result to the storage processing unit 34. Thus, as in the lower left drawing of FIG. 7, the storage processing unit 34 pastes the text data DT1 in public mode Pub to a user-specified region (enclosed by a dotted line) in the file FL1.

When the determination result indicating that the data DT can be added is obtained from the determining unit 38, the storage processing unit 34 adds the data DT to the file FL and causes the storage managing unit 36 to store the updated file FL containing the added data DT in the storage device 14 (step S28).

Figure 8:
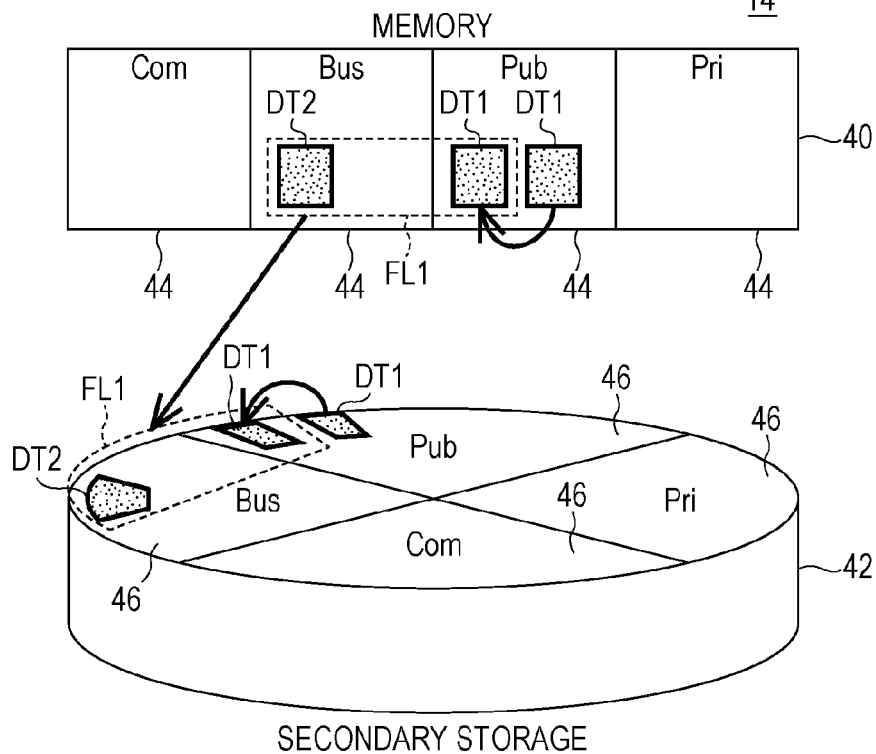
FIG. 8 illustrates the storage managing process.

When the determining unit 38 determines that the data DT1 can be added, the storage managing unit 36 maintains a security attribute of the data DT1 in business mode Bus and also maintains a security attribute of the data DT2 in public mode Pub. Maintaining the security attributes in the example of FIG. 7 will be specifically described. In this case, as illustrated in FIG. 8, the storage processing unit 34 copies the data DT1 generated in public mode Pub and stored in the physical storage regions 44 and 46 corresponding to public mode Pub to other areas in the physical storage regions 44 and 46 for public mode Pub, and causes the storage managing unit 36 to store the copied data DT1. Thus, two pieces of identical data DT1 are stored in each of the physical storage regions 44 and 46 for public mode Pub. This means that the updated file FL1 contains the data DT1 and DT2 stored in two physical storage regions 44 and 46 for each of public mode Pub and business mode Bus. Thus, physical addresses of the physical storage regions 44 and 46 enable the data DT1 and DT2 contained in the file FL1 to maintain the security attributes assigned when the data DT1 and DT2 are generated.

On the other hand, as illustrated in FIG. 3, the policy PL set by the storage managing unit 36 prohibits the use of the data DT between business mode Bus and private mode Pri. Therefore, when the data DT2 generated in business mode Bus illustrated in the lower left drawing of FIG. 7 is pasted into a file FL2 in private mode Pri, the determining unit 38 determines that the data DT cannot be added to the file FL2 (NO in step S26).

Then, until the executing unit 32 receives a user's end instruction from the input unit 12 (NO in step S30), steps S24 to S28 are repeated.

A description will be given of the case where steps S24 to S28 are repeated, so that data DT once added to a file FL in a different mode is further added to another file FL in a different mode. For example, assume that the user pastes the data DT1 generated in public mode Pub and added to the file FL1 created in business mode Bus, into the file FL2 created in private mode Pri. In this case, even when the data DT1 generated in public mode Pub is added to the file FL1 in business mode Bus, since the data DT1 is stored in the physical storage regions 44 and 46 corresponding to public mode Pub, the physical addresses of the physical storage regions 44 and 46 enable the determining unit 38 to recognize that the data DT1 has been generated in public mode Pub. Thus, in accordance with the policy PL illustrated in FIG. 3, the determining unit 38 determines that the data DT1 generated in public mode Pub can be added to the file FL2 in private mode Pri (YES in step S26).

In repetition of steps S24 to S28, when an instruction to add first data DT to which second data DT has been added to third data having a third security attribute assigned thereto is received, the determining unit 38 makes the following determination in accordance with the policy PL. That is, the determining unit 38 determines whether addition of a portion corresponding to the first data DT is possible depending on a first security attribute and the third security attribute, and also determines whether addition of a portion corresponding to the original second data DT is possible depending on a second security attribute and the third security attribute. For example, assume that the user pastes the file FL1 containing the data DT1 generated in public mode Pub and the data DT2 generated in business mode Bus into the file FL2 containing data DT3 generated in private mode Pri. In this case, the determining unit 38 makes a determination, in accordance with the policy PL in FIG. 3, on the basis of the security attributes of the data DT1 in public mode Pub and the data DT2 in business mode Bus contained in the file FL1 and the security attribute of the data DT3 contained in the file FL2. Thus, the determining unit 38 determines that the data DT1 in public mode Pub can be added to the file FL2, but determines that the data DT2 in business mode Bus cannot be added to the file FL2.

Then, upon receipt of a user's end instruction from the input unit 12 (YES in step S30), the executing unit 32 ends the storage managing process.

As described above, in the information processing apparatus 10, the storage managing unit 36 manages the storage device 14 by dividing it into a plurality of physical storage regions 44 and 46 for each of a plurality of modes. The storage processing unit 34 causes data DT generated in any mode to be stored in the physical storage regions 44 and 46 corresponding to the mode. This enables the information processing apparatus 10 to easily determine the mode in which the data DT is generated, depending on the physical storage regions 44 and 46 in which the data DT is stored. Therefore, the information processing apparatus 10 can easily set a security attribute appropriate for the mode on the basis of the physical storage regions 44 and 46 in which the data DT is stored.

In the information processing apparatus 10, in accordance with the policy PL that defines whether to permit data transmission and reception, the determining unit 38 can easily determine whether data DT can be added to a file FL created in a mode different from that in which the data DT has been generated. Since the determining unit 38 determines whether the data DT can be added in accordance with the policy PL, it is possible to improve security between different modes without changing an application associated with the file FL. Also, for example, the determining unit 38 permits addition of data DT generated in public mode Pub to a file FL created in business mode Bus in accordance with the policy PL. Therefore, the information processing apparatus 10 can improve usability while enhancing security.

In the information processing apparatus 10, even when data DT is added to a file FL created in a different mode, the storage managing unit 36 stores the data DT in the same physical storage regions 44 and 46 to maintain the security attribute. Thus, even after the data DT is added to the file FL created in a different mode, the determining unit 38 can properly determine whether to permit transmission and reception of the data DT on the basis of the security attribute of the mode in which the data DT has been generated.

In the information processing apparatus 10, the mode setting unit 30 sets a mode in accordance with not only a user input, but also information from the position detecting unit 16 and the transmitting/receiving unit 18. Thus, the mode setting unit 30 can set a mode appropriately depending on the position and environment of the information processing apparatus 10.

Figure 9:
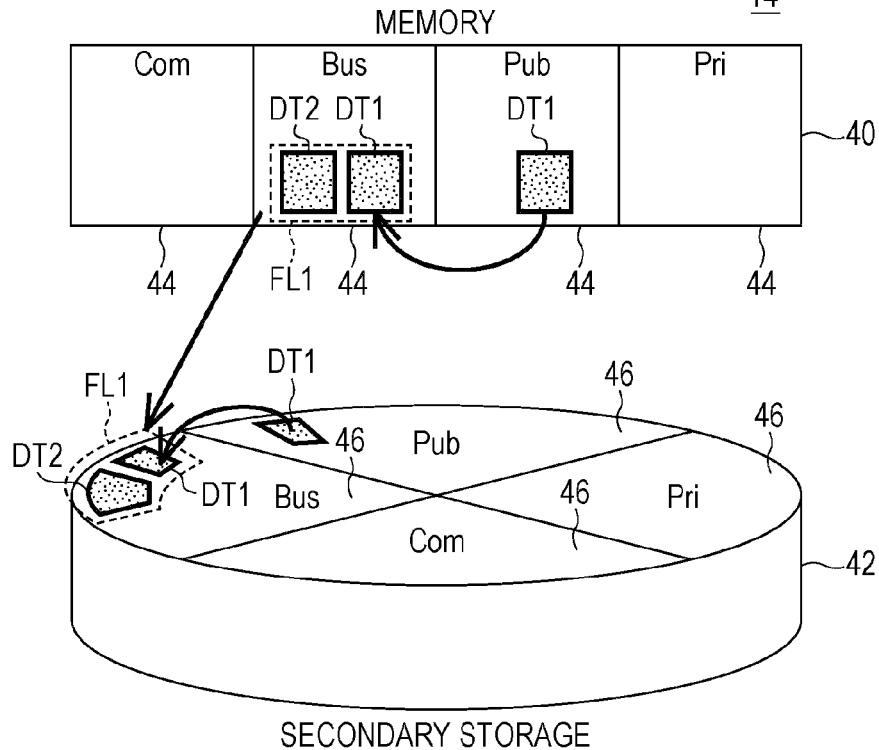
FIG. 9 illustrates an example where a security attribute is assigned by adding an identification flag.

FIG. 9 illustrates an embodiment where a security attribute is assigned by adding an identification flag. The storage processing unit 34 may add an identification flag to data DT for identifying a security attribute corresponding to a mode in which the data DT is generated. The storage processing unit 34 may add an identification flag to each data DT, or to each byte. When a file FL contains a plurality of pieces of data DT, the storage processing unit 34 adds an identification flag indicating a security attribute to each piece of data DT. For example, as illustrated in FIG. 9, data DT1 to be added to a file FL1 may be moved or copied, by the storage processing unit 34, to the physical storage regions 44 and 46 in which the file FL1 is stored. However, even when the data DT1 is moved or copied to different physical storage regions 44 and 46, the storage processing unit 34 does not change the identification flag. Since the data DT1 has the same identification flag even after being moved or copied, the determining unit 38 can determine whether the data DT1 can be added to the file FL1 in accordance with the mode in which the data DT1 has been generated.

Figure 10:
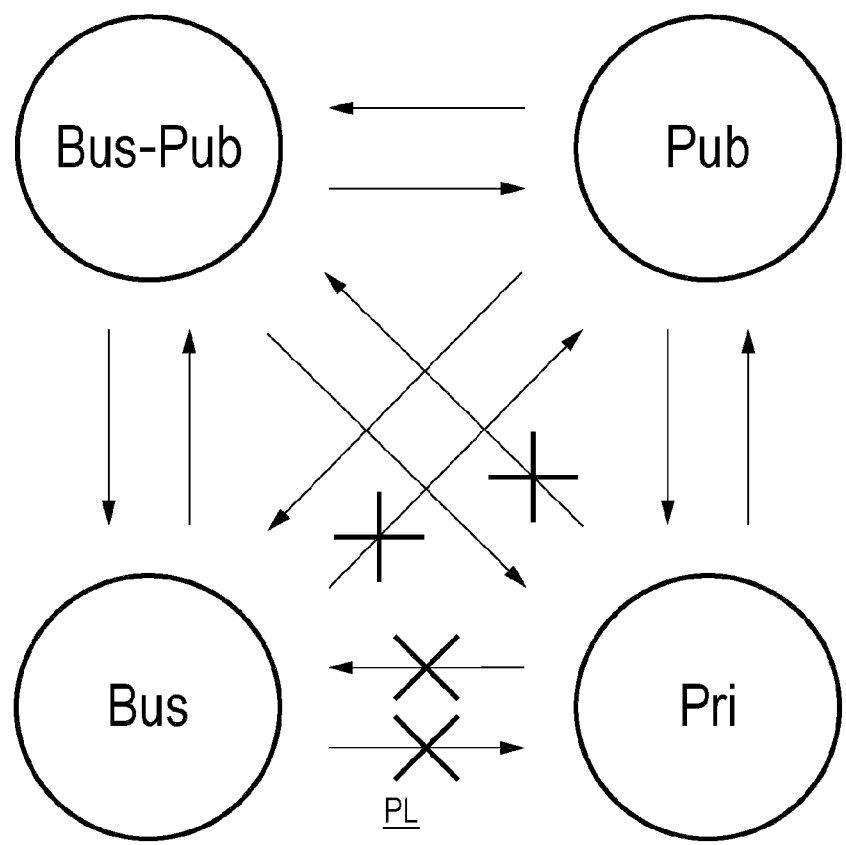
FIG. 10 illustrates a policy PL defined for four modes.

FIG. 10 illustrates a policy PL defined for four modes. As in FIG. 10, there may be business-public mode Bus-Pub added to the three modes described above. The interrelationships among business mode Bus, public mode Pub, and private mode Pri are the same as those illustrated in FIG. 3.

The storage managing unit 36 sets security attributes of business-public mode Bus-Pub and business mode Bus in the policy PL to permit data DT generated in business-public mode Bus-Pub and data DT generated in business mode Bus to be used in business mode Bus and business-public mode Bus-Pub, respectively.

The storage managing unit 36 sets security attributes of business-public mode Bus-Pub and public mode Pub in the policy PL to permit data DT generated in business-public mode Bus-Pub and data DT generated in public mode Pub to be used in public mode Pub and business-public mode Bus-Pub, respectively.

The storage managing unit 36 sets security attributes of private mode Pri and business-public mode Bus-Pub in the policy PL to permit data DT generated in business-public mode Bus-Pub to be used in private mode Pri but to prohibit data DT generated in private mode Pri from being used in business-public mode Bus-Pub.

Figure 11:
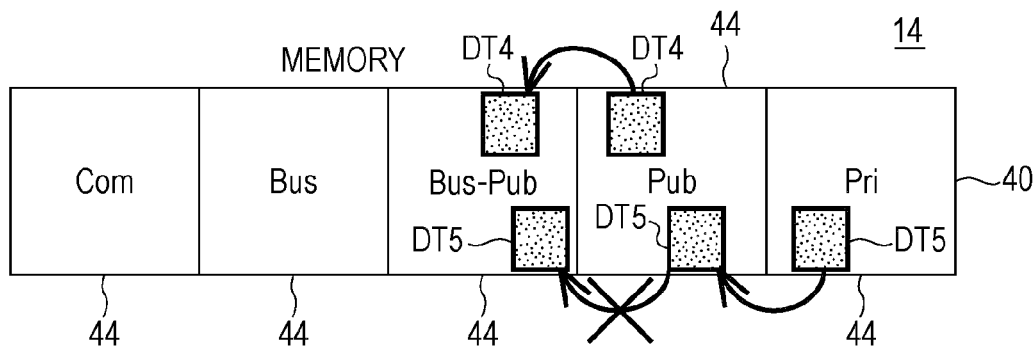
FIG. 11 illustrates how data DT is moved under the policy PL in FIG. 10.

FIG. 11 illustrates how data DT is moved under the policy PL in FIG. 10. In the example of FIG. 11, an identification flag is added to each data DT. As illustrated in FIG. 11, the determining unit 38 permits data DT4 generated in public mode Pub to be moved to the physical storage region 44 for business-public mode Bus-Pub and used.

The determining unit 38 permits data DT5 generated in private mode Pri to be moved to the physical storage region 44 for public mode Pub and used. However, the determining unit 38 prohibits the data DT5 generated in private mode Pri and moved to the physical storage region 44 for public mode Pub from being further moved to the physical storage region 44 for business-public mode Bus-Pub and used. This is because the policy PL set by the storage managing unit 36 prohibits the data DT5 generated in private mode Pri from being used in business-public mode Bus-Pub.

Figure 12:
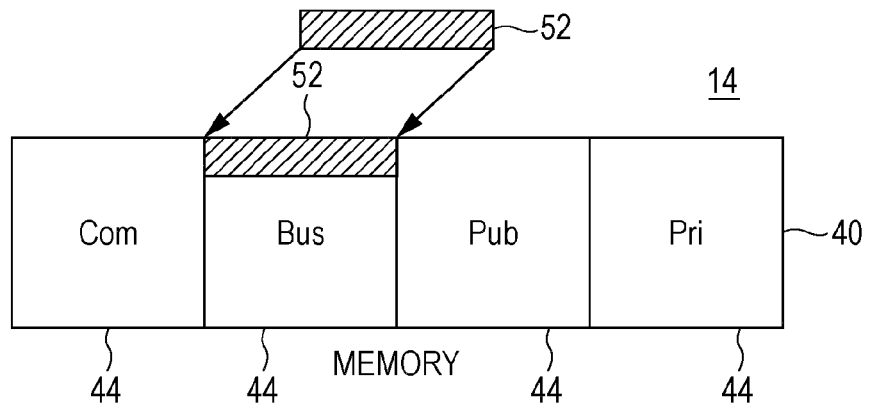
FIG. 12 illustrates a memory mapping method in which data DT is moved to remap the physical storage regions 44 and 46.
Figure 13:
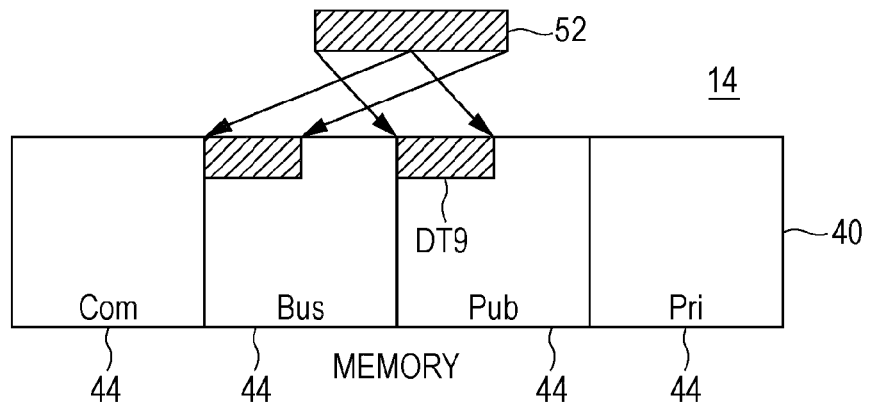
FIG. 13 illustrates the memory mapping method in which data DT is moved to remap the physical storage regions 44 and 46.
Figure 14:
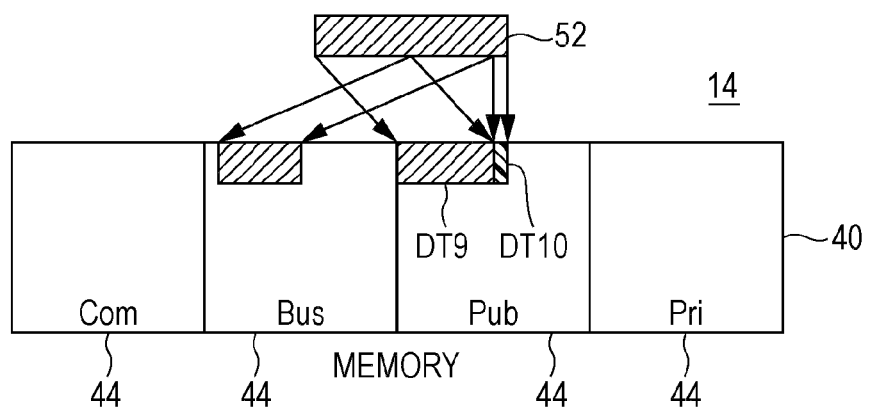
FIG. 14 illustrates the memory mapping method in which data DT is moved to remap the physical storage regions 44 and 46.

FIGS. 12, 13, and 14 illustrate a memory mapping method in which data DT is moved to remap the physical storage regions 44 and 46.

The storage processing unit 34 causes a plurality of pieces of data DT contained in a file FL to be stored separately in the physical storage regions 44 and 46 in accordance with security attributes corresponding to the data DT. In response to updating of a piece of data DT to have a different security attribute, the storage processing unit 34 may remap the piece of data DT to physical storage regions 44 and 46 corresponding to the security attribute after the update. FIGS. 12 to 14 illustrate an example where data DT is stored in the physical storage region 44 separately for each of public mode Pub and business mode Bus, and the data DT generated in public mode Pub is moved to the physical storage region 44 for business mode Bus for remapping.

First, as illustrated in FIG. 12, the storage processing unit 34 creates a buffer area 52 in the physical storage region 44 for business mode Bus. Next, as illustrated in FIG. 13, the storage processing unit 34 causes data DT9 stored in the physical storage region 44 for public mode Pub to be read into the buffer area 52. As illustrated in FIG. 14, after copying data DT10, which is part of the read-in data DT9 in public mode Pub, to the physical storage region 44 for public mode Pub, the storage processing unit 34 remaps the data DT9 to the physical storage region 44 for business mode Bus while maintaining the identification flag.

Figures 15, 16:
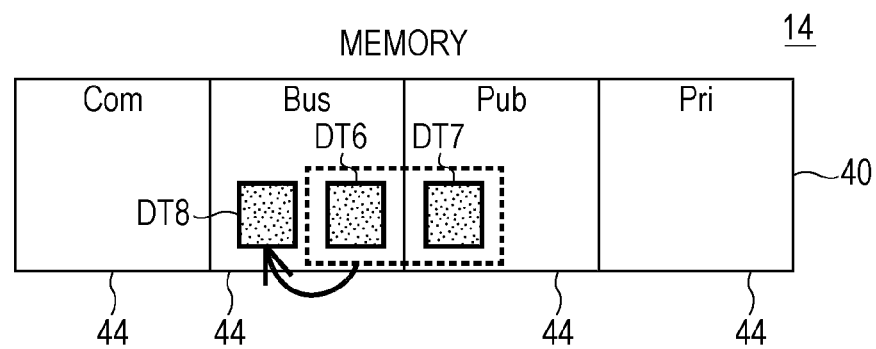
FIG. 15 illustrates an example of generating one piece of data from a plurality of pieces of data by computation.
FIG. 16 illustrates a list that compares security levels of different modes.

FIG. 15 illustrates an example of generating one piece of data from a plurality of pieces of data by computation. FIG. 16 illustrates a list that compares security levels of different modes. When a computation is performed between data DT having different security attributes, the storage processing unit 34 may assign, to the data DT after the computation, a security attribute defined to have a higher level in accordance with the policy PL defining levels of security attributes.

In the example illustrated in FIG. 15, data DT8 is generated from data DT6 and data DT7. The data DT6 is generated in business mode Bus and stored in the physical storage region 44 for business mode Bus, and the data DT7 is generated in public mode Pub and stored in the physical storage region 44 for public mode Pub. For example, the data DT8 is generated when a spreadsheet application computes the data DT7 by using a formula of the data DT6. The data DT8 may be generated when the data DT7, which is image data, is processed by the data DT6 for image processing.

In this case, in accordance with a list LT (see FIG. 16) included in the policy PL that defines the levels of security attributes, the storage processing unit 34 determines the physical storage region 44 for storing the data DT8 and assigns a security attribute to the data DT8 after the computation. For example, the list LT is an access control list (ACL) stored in the physical storage region 44 for common use in the storage device 14.

For example, the first line of the list LT indicates that the security level of business mode Bus is higher than that of public mode Pub. Also, the third line of the list LT indicates that the security level of private mode Pri is equal to that of business mode Bus.

In accordance with the list LT, the storage processing unit 34 causes the data DT8 generated from computation between the data DT6 in business mode Bus and the data DT7 in public mode Pub to be stored in the physical storage region 44 for business mode Bus having a higher security level.

Figure 17:
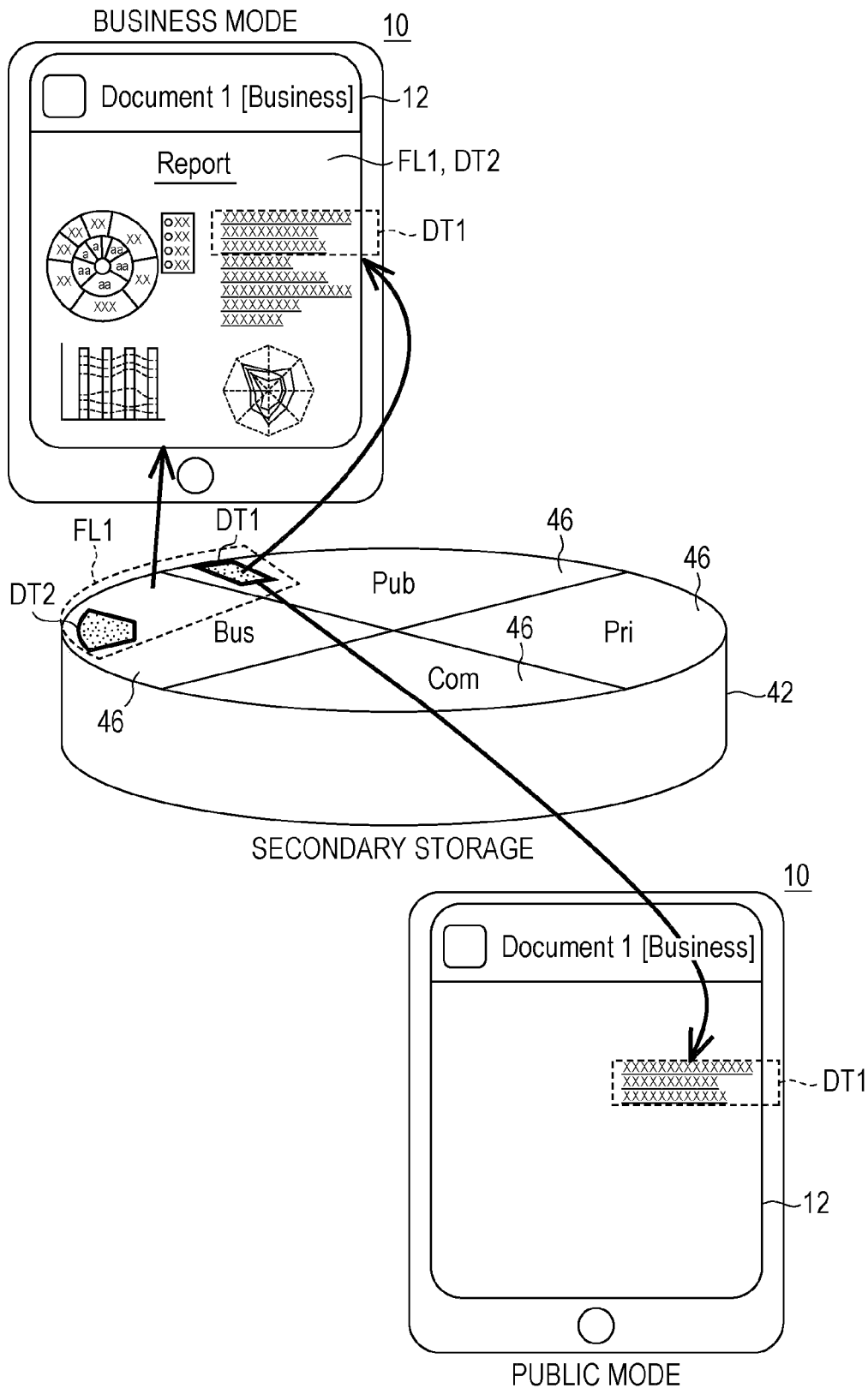
FIG. 17 illustrates an example where a file FL1 created in business mode Bus is displayed in public mode Pub.

FIG. 17 illustrates an example where a file FL1 created in business mode Bus is displayed in public mode Pub. The example of FIG. 17 follows the policy PL illustrated in FIG. 3.

When displaying the file FL1 in business mode Bus where data DT1 in public mode Pub can be used, the storage processing unit 34 outputs the data DT1 in public mode Pub and data DT2 in business mode Bus to the executing unit 32. Thus, the executing unit 32 causes an application to display all the data DT1 and DT2 contained in the file FL1 as in the upper drawing of FIG. 17.

In public mode Pub where the data DT2 in business mode Bus cannot be used, the storage processing unit 34 outputs only the data DT1 stored in the physical storage region 46 for public mode Pub, instead of all the data DT1 and DT2 contained in the file FL1, to the executing unit 32. Thus, the executing unit 32 causes an application to display only the data DT1 stored in the physical storage region 46 for public mode Pub, instead of all the data DT1 and DT2 contained in the file FL1.

Figure 18:
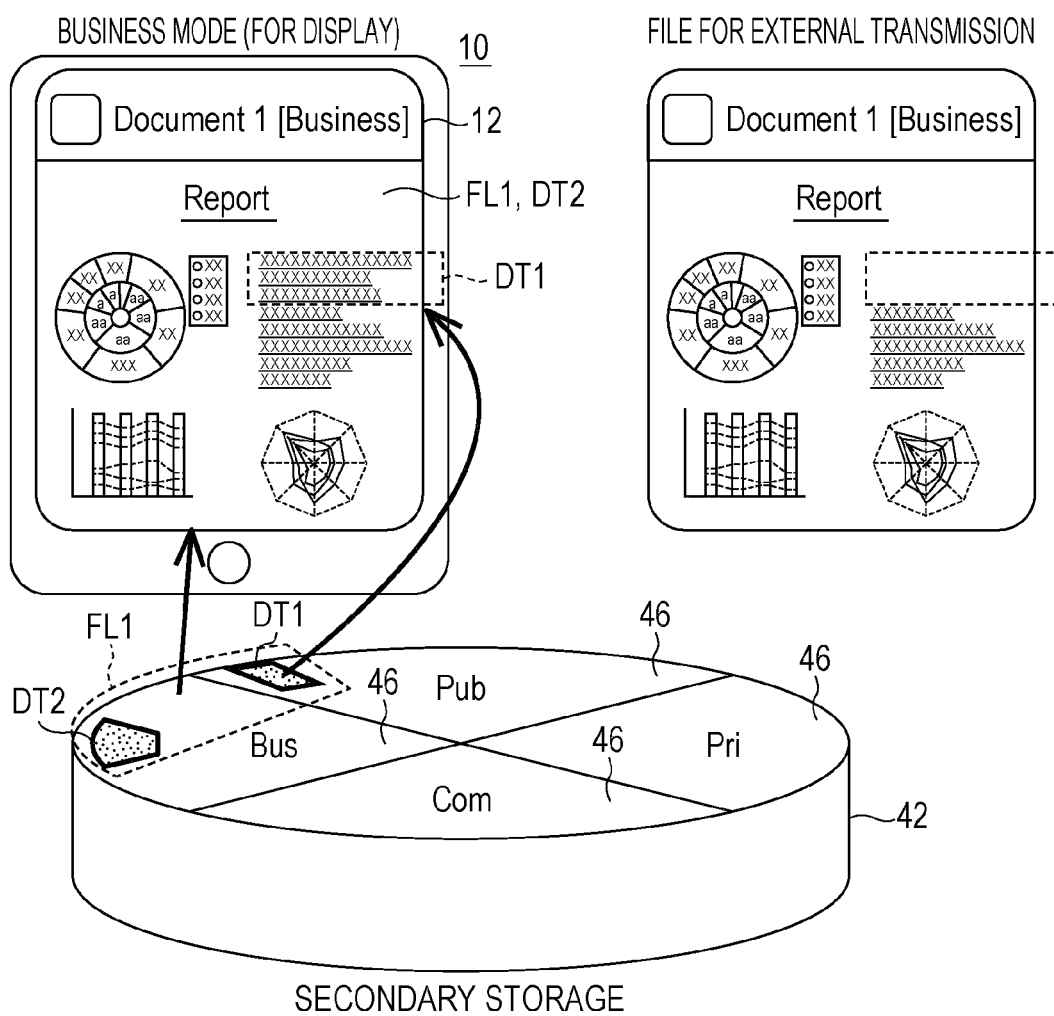
FIG. 18 illustrates an example where a file FL1 created in business mode Bus is transmitted to the outside.

FIG. 18 illustrates an example where a file FL1 created in business mode Bus is transmitted to the outside. The example of FIG. 18 follows the policy PL illustrated in FIG. 3. Transmission to the outside includes the case where the same user transmits and receives data DT using a plurality of different information processing apparatuses 10.

As illustrated in FIG. 18, in transmission of the file FL1 in business mode Bus, the storage processing unit 34 causes the transmitting/receiving unit 18 to transmit only the data DT2 generated in business mode Bus, instead of both the data DT1 and DT2 contained in the file FL1, the data DT2 being stored in the physical storage region 46 for business mode Bus.

In transmission of the file FL1 in public mode Pub, the storage processing unit 34 causes the transmitting/receiving unit 18 to transmit only the data DT1 generated in public mode Pub, instead of both the data DT1 and DT2 contained in the file FL1, the data DT1 being stored in the physical storage region 46 for public mode Pub. In public mode Pub, the storage processing unit 34 may prohibit transmission of the file FL1 created in business mode Bus in accordance with the policy PL.

The connection relations, shapes, display formats, and interrelationships of components in each embodiment described above may be changed where appropriate. Also, the embodiments described above may be combined.

The storage processing unit 34 may change the security attribute of data DT in accordance with a user's instruction. For example, in accordance with a user's instruction from the input unit 12, the storage processing unit 34 may change data DT having a security attribute of public mode Pub to data DT having a security attribute of business mode Bus. In this case, the storage processing unit 34 may change the security attribute by moving the data DT from the physical storage regions 44 and 46 for public mode Pub to the physical storage regions 44 and 46 for business mode Bus, or by changing the identification flag.

The determining unit 38 may determine whether an application specified by data DT stored in the physical storage regions 44 and 46 can be started, in accordance with a security attribute corresponding to the physical storage regions 44 and 46 and the definition of the policy PL corresponding to a security attribute for the mode in which the application is in operation. For example, when data DT stored in the physical storage regions 44 and 46 for business mode Bus is to be opened by an application, if the data DT has a security attribute that allows the use of the data DT in business mode Bus and allows the start of the application in business mode Bus, the determining unit 38 may start the application and open the data DT.

The storage processing unit 34 may set a policy PL that defines a different security attribute for viewing and editing. For example, the storage processing unit 34 may set the security such that data DT generated in business mode Bus can be viewed but cannot be edited in public mode Pub.

The embodiments described above assume that the application is stored in the physical storage regions 44 and 46 for common use. Alternatively, the application may be stored in any physical storage regions 44 and 46 and the determination as to whether the application can be started may be made in accordance with the security attribute of the physical storage regions 44 and 46 and the policy PL. Even in this case, when the application creates a file FL from a plurality of pieces of data DT stored in physical storage regions 44 and 46 different from those corresponding to the mode of the application, the storage processing unit 34 assigns a different security attribute to each of the plurality of pieces of data DT. For example, assume that an application is stored in physical storage regions 44 and 46 for business mode Bus and is running in business mode Bus. In this case, when the application creates a file FL from a plurality of pieces of data DT stored in physical storage regions 44 and 46 different from those corresponding to business mode Bus, for example, from a plurality of pieces of data DT stored in physical storage regions 44 and 46 for public mode Pub, the storage processing unit 34 assigns a different security attribute to each of the plurality of pieces of data DT by creating the file FL, with the plurality of pieces of data DT stored in the original physical storage regions 44 and 46.

When the application is stored in any physical storage regions 44 and 46, the storage processing unit 34 may assign a security attribute to the data DT in accordance with the security attribute of the data DT and the security attribute of the application. Specifically, the storage processing unit 34 may assign a security attribute defined to have a higher level in accordance with the policy PL defining the levels of security attributes, the security attribute being either the security attribute of the data DT or the security attribute of the mode in which the application reading and processing the data DT is in operation, to data DT stored in the application. For example, when data DT is stored in physical storage regions 44 and 46 for business mode Bus and an application is in operation in public mode Pub, since the security attribute of business mode Bus has a higher level than that of public mode Pub, the storage processing unit 34 stores the data DT in the physical storage regions 44 and 46 for business mode Bus and assigns the security attribute of business mode Bus to the data DT.

Figure 19:
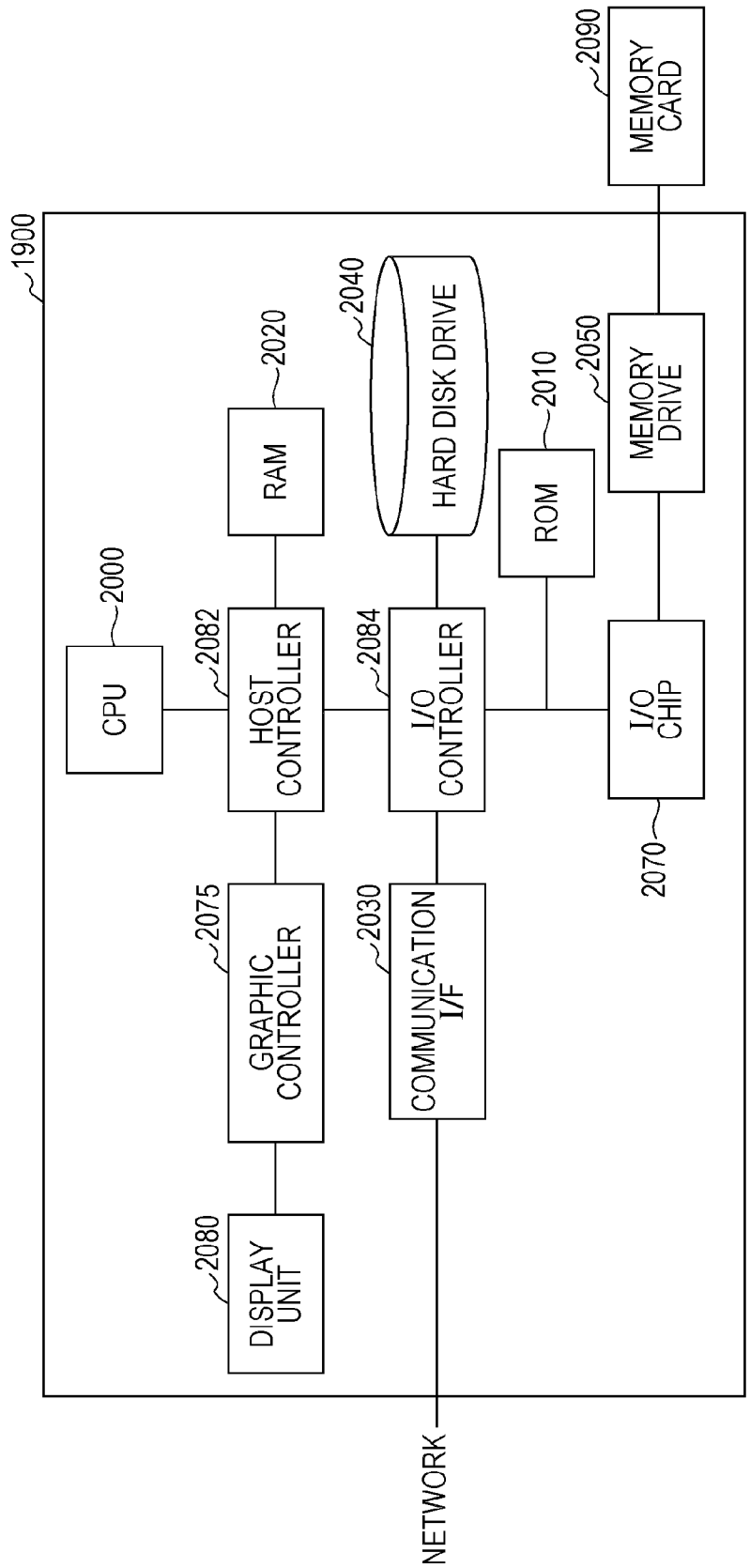
FIG. 19 illustrates a hardware configuration of a computer 1900 according to an embodiment.

FIG. 19 illustrates a hardware configuration of a computer 1900 according to an embodiment. The computer 1900 according to the present embodiment is an example of the information processing apparatus 10. The computer 1900 includes a CPU peripheral section having a CPU 2000, a RAM 2020, a graphic controller 2075, and a display unit 2080 connected to one another by a host controller 2082; an input/output unit having a communication interface 2030 and a hard disk drive 2040 connected to the host controller 2082 by an input/output controller 2084; and a legacy input/output unit having a read-only memory (ROM) 2010, a memory drive 2050, and an input/output chip 2070 connected to the input/output controller 2084.

The host controller 2082 connects the RAM 2020 to the CPU 2000 and the graphic controller 2075 that access the RAM 2020 at a high transfer rate. The CPU 2000 operates in accordance with programs stored in the ROM 2010 and the RAM 2020, and controls each part of the computer 1900. The graphic controller 2075 acquires image data generated in a frame buffer in the RAM 2020 by the CPU 2000 or the like and displays the acquired image data on the display unit 2080. Alternatively, the graphic controller 2075 may include a frame buffer that stores image data generated by the CPU 2000 or the like.

The input/output controller 2084 connects the host controller 2082, the communication interface 2030 which is a relatively high-speed input/output device, and the hard disk drive 2040. The communication interface 2030 communicates with other devices via a network. The hard disk drive 2040 stores data and programs, such as a display program, used by the CPU 2000 in the computer 1900.

The ROM 2010, the memory drive 2050, and a relatively low-speed input/output device, such as the input/output chip 2070, are connected to the input/output controller 2084. The ROM 2010 stores a boot program executed when the computer 1900 is started and/or a program dependent on the hardware of the computer 1900. The memory drive 2050 reads data or a program, such as a display program, from a memory card 2090 and provides the read data or program via the RAM 2020 to the hard disk drive 2040. The input/output chip 2070 connects the memory drive 2050 to the input/output controller 2084. At the same time, the input/output chip 2070 connects various input/output devices to the input/output controller 2084 via a parallel port, a serial port, a keyboard port, a mouse port, etc.

A program provided via the RAM 2020 to the hard disk drive 2040 is stored in a recording medium, such as the memory card 2090 or an integrated circuit (IC) card, and supplied by the user. A program, such as a display program, is read out of a recording medium, installed via the RAM 2020 on the hard disk drive 2040 in the computer 1900, and executed by the CPU 2000.

The program installed on the computer 1900 and causing the computer 1900 to function as the information processing apparatus 10 includes a mode determining module, an executing module, a storage processing module, a storage managing module, and a determining module. The program and the modules act on the CPU 2000 and the like to cause the computer 1900 to function as each of the mode determining module, the executing module, the storage processing module, the storage managing module, and the determining module.

Information processing described in the program is read by the computer 1900, which then functions as the mode determining module, the executing module, the storage processing module, the storage managing module, and the determining module which are concrete units implemented through coordination between software and various hardware resources described above. When these concrete units compute or process information appropriate for the intended use of the computer 1900 according to the present embodiment, the information processing apparatus 10 appropriate for the intended use is realized.

For example, for the computer 1900 to communicate with an external device, the CPU 2000 executes a communication program loaded in the RAM 2020 and instructs the communication interface 2030 to perform communication processing on the basis of processing described in the communication program. Under the control of the CPU 2000, the communication interface 2030 reads transmit data stored in a transmit buffer area or the like in a storage device, such as the RAM 2020, the hard disk drive 2040, or the memory card 2090 and transmits the read data to a network, or writes receive data received from the network to a receive buffer area or the like in the storage device. As described, the communication interface 2030 may transfer the transmit and receive data from and to the storage device via direct memory access (DMA). Alternatively, the CPU 2000 may read data from a storage device or the communication interface 2030, which is a transfer source, and write the data to the communication interface 2030 or a storage device, which is a transfer destination, so as to transfer the transmit and receive data.

The CPU 2000 reads all or necessary part of files, databases, or the like stored in the external storage device, such as the hard disk drive 2040 or the memory drive 2050 (memory card 2090), into the RAM 2020 via DMA transfer or the like, and performs various types of processing on the data in the RAM 2020. Then the CPU 2000 writes the processed data back to the external storage device via DMA transfer or the like. In this processing, the RAM 2020 can be regarded as a component that temporarily holds the contents of the external storage device. Therefore, in the present embodiment, the RAM 2020, the external storage device, and the like are collectively referred to as a memory, a storage unit, or a storage device. Various types of information, such as various programs, data, tables, and databases, in the present embodiment are stored in such a storage device, and are subjected to information processing. The CPU 2000 may hold part of data in the RAM 2020 in a cache memory, and write and read data to and from the cache memory. In such a configuration, the cache memory performs part of the function of the RAM 2020. Therefore, in the present embodiment, the cache memory is also regarded as being included in the RAM 2020, memory, and/or storage device, except in cases where the cache memory is shown separately.

On data read from the RAM 2020, the CPU 2000 performs various types of processing specified by a sequence of instructions of the program, including various computations, information processing, conditional judgment, and information retrieval and replacement described in the present embodiment, and writes the processed data back to the RAM 2020. For example, in conditional judgment, the CPU 2000 determines whether each of various variables shown in the present embodiment satisfies a condition, such as whether the variable is larger, smaller, equal to or larger, or equal to or smaller than other variables or constants. If the condition is satisfied (or not satisfied), branching to another sequence of instructions takes place, or a subroutine is called. The CPU 2000 is capable of searching for information stored in a file or a database in a storage device.

The programs or modules described above may be stored in an external recording medium. Besides the memory card 2090, an optical recording medium such as a digital versatile disc (DVD) or a compact disc (CD), a magneto-optical recording medium such as a magneto-optical (MO) disk, a tape medium, and a semiconductor memory such as an IC card may be used as a recording medium. A storage device, such as a hard disk or a RAM, in a server system connected to a dedicated communication network or the Internet may be used as a recording medium, and the programs may be provided to the computer 1900 via the network.

Although the present invention has been described using the embodiments, the technical scope of the present invention is not limited to the scope described in the embodiments. It is apparent to those skilled in the art that various modifications and improvements can be made to the embodiments described above. It is apparent from the description of the scope of claims that such modified or improved embodiments may also be included in the technical scope of the present invention.

The order of execution of each processing in operations, procedures, steps, stages, and the like of the apparatus, system, program, and method described in the scope of claims, description, and drawings is not particularly stated with such phrases as "before" and "prior to." It should be noted that the processing may be implemented in any order unless the output of previous processing is used in subsequent processing. Even if phrases such as "first" and "next" may be used for convenience in the scope of claims, the description, and the operation flow in the drawing, this does not mean that it is essential to implement the processing in this order.

REFERENCE SIGNS LIST

10: information processing apparatus
12: input unit
14: storage device
16: position detecting unit
18: transmitting/receiving unit
20: processor
30: mode setting unit
32: executing unit
34: storage processing unit
36: storage managing unit
38: determining unit
40: memory
42: secondary storage
44: physical storage region
46: physical storage region
50: mode list
52: buffer area
1900: computer
2000: CPU
2010: ROM
2020: RAM
2030: communication interface
2040: hard disk drive
2050: memory drive
2070: input/output chip
2075: graphic controller
2080: display unit
2082: host controller
2084: input/output controller
2090: memory card

What is claimed:

1. An information processing apparatus comprising:
a storage managing unit configured to manage a storage device by dividing the storage device into a plurality of physical storage regions corresponding to respective modes used by the information processing apparatus; and
a storage processing unit configured to cause data generated by the information processing apparatus during operation in a mode to be stored in a physical storage region corresponding to the mode, wherein the storage managing unit stores a policy in the storage device, the policy defining whether to permit the use of data between a plurality of security attributes corresponding to the respective physical storage regions.

2. The information processing apparatus according to claim 1, further comprising a determining unit configured to determine, upon receiving an instruction to add second data having a second security attribute assigned thereto to first data having a first security attribute assigned thereto, whether the addition is possible in accordance with a mode in operation and the policy, wherein if the determining unit determines that the addition is possible, the storage managing unit maintains the first security attribute of the first data and maintains the second security attribute of the second data.

3. The information processing apparatus according to claim 2, wherein, upon receiving an instruction to add the first data having the second data added thereto to third data having a third security attribute assigned thereto, the determining unit determines whether the addition of a portion corresponding to the first data is possible depending on the first security attribute and the third security attribute and determines whether the addition of a portion corresponding to the original second data is possible depending on the second security attribute and the third security attribute, in accordance with the policy.

4. The information processing apparatus according to claim 1, further comprising a mode setting unit configured to set one of the plurality of modes used by the information processing apparatus in accordance with at least one of positional information and network information of the information processing apparatus.

5. The information processing apparatus according to claim 1, wherein when a computation is performed between the data having different security attributes, the storage processing unit assigns, to the data after the computation, a security attribute defined to have a higher level in accordance with the policy defining levels of the security attributes.

6. The information processing apparatus according to claim 1, wherein the storage processing unit assigns a security attribute defined to have a higher level in accordance with the policy defining levels of the security attributes, the security attribute being either a security attribute of the data or a security attribute of a mode where an application reading and processing the data is in operation, to the data stored by the application.

7. The information processing apparatus according to claim 1, wherein the storage processing unit is configured to change the security attribute of the data in accordance with a user's instruction.

8. The information processing apparatus according to claim 2, wherein the determining unit determines whether an application specified by the data stored in the physical storage region can be started in accordance with a security attribute corresponding to the physical storage region and a definition of the policy for a security attribute corresponding to a mode where the application is in operation.

9. The information processing apparatus according to claim 1, wherein when an application creates a file from a plurality of pieces of data stored in a physical storage region different from a physical storage region corresponding to a mode of the application, the storage processing unit assigns a different security attribute to each of the plurality of pieces of data.

10. The information processing apparatus according to claim 9, wherein the storage processing unit identifies the security attribute of the data on the basis of a physical address of the physical storage region where the data is stored.

11. The information processing apparatus according to claim 9, wherein the storage processing unit adds an identification flag indicating the security attribute to each of the plurality of pieces of data contained in the file.

12. An information processing apparatus comprising:
a storage managing unit configured to manage a storage device by dividing the storage device into a plurality of physical storage regions corresponding to respective modes used by the information processing apparatus; and
a storage processing unit configured to cause data generated by the information processing apparatus during operation in a mode to be stored in a physical storage region corresponding to the mode, wherein the storage processing unit causes a plurality of pieces of data contained in a file to be stored separately in physical storage regions in accordance with security attributes corresponding to the data; and
in response to updating of a piece of data to have a different security attribute, the storage processing unit remaps the piece of data to a physical storage region corresponding to the security attribute after the update.

13. A method comprising:
managing a storage device by dividing the storage device into a plurality of physical storage regions corresponding to respective modes used by an information processing apparatus; and
storing data generated by the information processing apparatus during operation in a mode in a physical storage region corresponding to the mode, wherein the storage managing unit stores a policy in the storage device, the policy defining whether to permit the use of data between a plurality of security attributes corresponding to the respective physical storage regions.

14. A non-transitory recording medium having stored thereon program code that is operable, when executed by a data processor, to perform the steps of:
managing a storage device by dividing the storage device into a plurality of physical storage regions corresponding to respective modes used by an information processing apparatus; and
storing data generated by the information processing apparatus during operation in a mode in a physical storage region corresponding to the mode, wherein the storage managing unit stores a policy in the storage device, the policy defining whether to permit the use of data between a plurality of security attributes corresponding to the respective physical storage regions.

* * * * *